(12) United States Patent
Bleier (10) Patent No.: US 6,402,036 B1
(45) Date of Patent: Jun. 11, 2002

(54) SMART CARD READER (75) Inventor: Robert Bleier, Bad Wimpfen (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/216,836

(22) Filed: Dec. 21, 1998

(30) Foreign Application Priority Data

Dec. 23, 1997 (DE) .......................... 197 57 625

(51) Int. Cl.⁷ .............................. G06K 7/00; G06K 7/06
(52) U.S. Cl. ...................... 235/486; 235/441
(58) Field of Search ................ 235/380, 382, 235/441, 482, 483, 492, 486, 479; 439/260, 267; 361/737

(56) References Cited

U.S. PATENT DOCUMENTS

| | | | | |
|---|---|---|---|---|
| 4,874,323 A | * | 10/1989 | Shibano | 439/260 |
| 4,961,710 A | * | 10/1990 | Komatsu | 439/267 |
| 4,984,994 A | | 1/1991 | Yamamoto | 235/441 |
| 5,091,618 A | * | 2/1992 | Takahashi | 235/441 |
| 5,936,222 A | * | 8/1999 | Korsunsky et al. | 235/441 |
| 5,984,184 A | * | 11/1999 | Kojima | 235/441 |
| 6,015,311 A | * | 1/2000 | Benjamin et al. | 235/441 |

FOREIGN PATENT DOCUMENTS

| | | |
|---|---|---|
| EP | 376087 A | 7/1990 |
| EP | 468828 A | 1/1992 |

OTHER PUBLICATIONS

European Search Report, EP 98 12 4442.

* cited by examiner

Primary Examiner—Michael G. Lee
Assistant Examiner—Larry D Taylor
(74) Attorney, Agent, or Firm—Blank Rome LLP (57) ABSTRACT

A smart card reader (100) has a housing (2) with contact elements (3) fixed in the housing, which are resiliently biased into a space into which the smart card is slid. When released, the contacts (3) move into the space to make electrical contact with areas on the smart card now inserted. The contacts are held out of the space by a pivot member (4) which is actuated by a cover (5) which is slidably mounted in the housing. The cover, pushed inward by the inserted card, moves the pivot member. Thus there is no contact until the card is in position.

7 Claims, 9 Drawing Sheets

SMART CARD READER

BACKGROUND OF THE INVENTION

I. Field of the Invention

The invention relates to a smart card reader. More particularly, the present invention relates to a PCB (printed circuit board) smart card connector with contact elements which can be moved into a non-contact position.

II. Description of the Related Art

Smart cards readers which are also called chip card readers or chip cart contacting apparatus are known in a large number of different designs. Smart card readers are adapted to provide a connection between contact elements mounted in the smart card reader and card contacts provided on a surface of a smart card. The smart card reader is typically adapted to be placed on a printed circuit board and the termination ends of the contact elements are adapted to be connected with the contact paths of said printed circuit board.

It is an object of the present invention to provide a smart card reader comprising a contact system consisting of a plurality of contact elements such that its contact elements are moved into contact with the smart card contacts, which form a card contact field, only at the time when the card contacts are located in a position where the contact elements will not slide over the card before making contact with said card contacts.

It is another object of the present invention to provide a smart card reader suitable for being soldered into a printed circuit board. According to a further object of the invention, compatibility should be provided for an already existing layout. Preferably, the smart card reader should fit into an XLC (low cost) layout.

It is another object of the invention to provide a smart card reader having outer dimensions which correspond to the dimensions of the XLC (low cost) reader.

According to a still further object of the invention. a smart card reader is provided which carefully handles the smart card by causing a sliding movement between the smart card surface and the contact elements.

Further, an object of the invention relates to the mounting of the smart card reader on printed circuit boards such that the mounting process can be easily carried out by using snap-in elements and pins

SUMMARY OF THE INVENTION

In accordance with the present invention, a smart card reader is provided which comprises a housing, contact elements mounted in said housing, and pivot means for moving said contact elements between a non-contact position and a smart card contact position. The contact elements are preferably biased.

Said pivot means is adapted to hold said contact elements in a depressed condition when the smart card reader is in its smart card input/output position. also called insert/take-out position. The input/output position of the smart card reader is the position where a smart card can be inserted or can be taken out of the smart card reader. If a smart card is inserted into the smart card reader, starting from its input/output position, the smart card eventually reaches its end or reading position. The end position is also called reading position because in this position, the contact elements of the smart reader are in contact with the card contacts of the smart card so as to "read out" the information in the smart card and possibly supply new information to the chip which is located in the smart card.

The pivot means are preferably provided with a control or cam surface or cam curve. Preferably, the pivot means is moved or controlled by a cover or card receiving means movably mounted in said housing. Preferably, the cover is mounted for a reciprocal movement in said housing and only in longitudinal direction thereof.

Preferably, the contact elements are elongate and form contact areas in the form of contact cusps which can be lowered when the smart card reader is in its input/output position.

According to a further aspect of the invention, the smart card reader comprises an insert slot for the smart card. The insert slot extends in longitudinal direction through said smart card reader and is adapted to receive the smart card. By lowering the contact elements, in particular the contact cusps of the contact elements, into a position lower than the card receiving slot, vandals will have difficulties in destroying the smart card reader, particularly the contact elements, because any foreign matter like knives pushed into the insert slot will not encounter the contact elements, in particular the contact cusps of the contact elements because they are lowered when no smart card is inserted.

In accordance with another embodiment of the present invention, the smart card reader comprises a housing or frame carrying contact elements, a cover reciprocally mounted in said cover and pivot means actuated by said cover such that when a smart card is inserted, the cover will pivot the pivot means which in turn release the contact elements so that the contact elements can move towards the surface of the smart card carrying the card contacts and contact the smart card contacts. In accordance with the invention, the design is such that the contact elements reach their end or contacting position with the smart card contacts during the last third of possible movement of said contact elements.

In accordance with another embodiment of the invention, separate brake means are provided to hold the smart card within the smart card reader. Preferably, said brake means acts on the width of the smart card, i.e. laterally and thus perpendicularly with respect to the direction of insertion.

According to a further embodiment of the invention, an end position switch is provided which is in particular designed to indicate the end position of the smart card by being open. Preferably an XLC (low cost) contact is used for the end position switch.

In accordance with another preferred embodiment of the invention, the cover is movable together with the smart card into the reading position, and it will also automatically follow the smart card towards the insert/take-out position, i.e. in the pull-out direction of the smart card if the smart card is pulled out of the smart card reader. When the smart card is (manually) pulled out of the smart card reader, then the end position switch described above will close (indicating thereby that the smart card has left the reading position). The design of the smart card reader is such that only after the end position switch has been closed, the contact elements will be moved away from the smart card contacts forming said contact field. This timed movement of the contact elements of the end position switch and of the contact elements of the smart card reader away from the smart card contact field is controlled by means of pivot means.

Additional features of the smart card reader of the invention are its module design, the use of a end position switch/housing-component, a component comprising the housing and the end position switch. and the XLC (low cost)

contact elements. An additional advantage of the smart card reader of the invention is that it can be readily assembled.

Summarizing it can be said that the invention provides for the controlled movement of the contact elements into a lowered position when the card is removed from the smart card reader. The movement of the smart card into its reading position provides for a release and lifting of the contact elements so as to provide that after the release the contact elements provide full force, i.e. the contact elements are in good engagement with the smart cart contacts (of a chip which is located within said smart card)

In a method provided by the invention, a smart card is adapted to move a cover which releases and pivots pivot means. Said pivot means in turn releases the contact elements of the chip card reader so that the contact elements, in particular the contact cusps of said contact elements, move into engagement with the smart card contacts of said smart card.

In accordance with the present invention, the release of the contact elements is not initiated or carried out due to the thickness of the card, but due to the movement, in particular the sliding movement of the smart card.

The smart card reader of the invention is particularly suitable for applications where the surface of the smart card needs to protected and for contact elements which are required to have a high number of operating cycles.

BRIEF DESCRIPTION OF THE DRAWINGS

The features, objects and advantages of the present invention will become more apparent from the detailed description set forth below when taken in conjunction with the drawings:

FIGS. 3–13 disclose another preferred embodiment of a smart card reader of the invention;

DETAILED DESCRIPTION OF PREFERRED EMBODIMENTS

Figure 1:
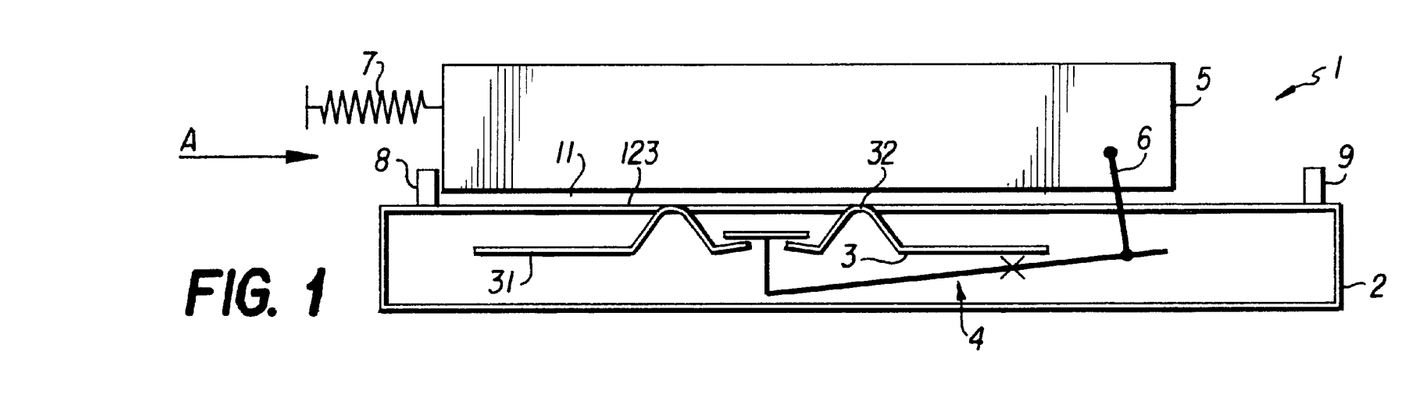
FIG. 1 is a schematic representation of a smart card reader of the invention in its input/output or insert/take-out position.
Figure 2:
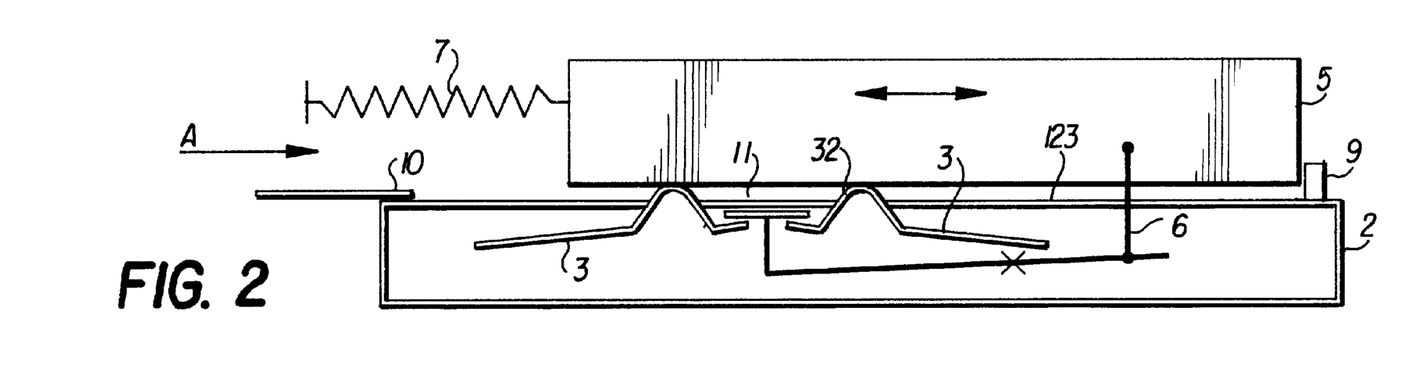
FIG. 2 is a schematic representation of the smart card reader of FIG. 1 in its reading position.

FIG. 1 and 2 show schematically a smart card reader 1 which comprises a contact support or housing (also called a frame) 2 and a cover 5. Housing 2 can be mounted for example on a printed circuit board, not shown. A plurality of contact elements 3 is fixedly mounted in said housing 2. Contact element actuating means, preferably in the form of a pivot means 4, are preferably mounted in said housing 2 and are adapted to hold the contact elements 3 in a rest or non-contact position. Preferably, the contact elements 3 are designed such that they are resiliently held back by the pivot means 4 in a position (shown in FIG. 1) where they have the tendency to move upwardly beyond a support surface 123 of the housing 2 for a smart card 10. In this rest or non-contact position, the contact elements 3 are biased against said pivot means 4 and are blocked from a movement beyond said support surface 123.

FIG. 2 discloses in a somewhat exaggerated manner the condition of the smart card reader 1 in a reading position, i.e. the position where the contact elements 3 have been released by said pivot means 4 and have carried out a spring-like movement so that contact cusps 32 of the contact elements 3 extend beyond or upwardly with respect to the support surface 123 of said housing 2, so as to contact, i.e. engage, card contacts formed in the downwardly facing surface of the smart card 10. It is to be noted that the smart card 10 is shown for the embodiment of FIGS. 1 and 2 only in FIG. 2 and in a position where it is not inserted into the smart card reader 1. This is done for reasons of simplicity only. In fact, in FIG. 1 the smart card 10 should be shown in a position where it is not inserted, but in FIG. 2 it should be shown in the inserted position with the contact cusps of the contacts elements 3 being in engagement with the smart card contacts of the card 10 (and not with the bottom surface of the cover 5).

Turning now again to FIG. 1, the cover 5 is shown in the insert/take-out position for the chip card 10. Thus, the entire smart card reader 1 and more specifically, the cover 5 are in the insert/take-out position, with the cover 5 being in abutment with an abutment means 8 provided on the housing 2. A spring 70, which is acting between the housing 2 and the cover 5, maintains the cover 5 in the insert/take-out or input/output position. The cover 5 is reciprocally mounted for a sliding movement preferably on the housing 2. Contact element actuating means in the form of pivot means 4 are preferably pivotally mounted on said housing 2 and are actuatable by said cover 5 so as to assume a contact element withholding position or non-contact position (as shown in FIG. 1) and a contact element engagement or contact position (shown in FIG. 2).

The operation of the smart card reader 1 of the embodiment of FIG. 1 is as follows. When inserting a smart card 10 into an insert slot 11 of the smart card reader 1, the smart card comes into engagement with an abutment means (not shown in FIGS. 1 and 2) of cover 5, thus pushing cover 5 against the force of spring 7 into engagement with an abutment means 9 provided on the housing 2. During the movement towards the abutment means 9 the cover 5 actuates via a coupling or a control means 6 contact element actuating means 4, which are preferably in the form of said pivot means. Thus, said pivot means 4 release the contact elements 3 so that they can move into contact with the smart cart contacts of the smart card 10, as is shown in FIG. 2. It should again be emphasized that one has to imagine that card 10 shown in FIG. 2 in an non-inserted position is actually in the insert slot 11 at the time the cover 5 is in abutment with abutment means 9. A brake, not shown, holds card 10 in the reading position of FIG. 2 until card 10 is removed from the reading position preferably by hand. For this purpose, an end of the card sticking out of the left-hand end of the insert slot 11 is gripped by the fingers of an operator and pulled leftwardly in FIG. 2, with the consequence that spring 7 pulls the cover 5 simultaneously to the left into the position shown in FIG. 1.

FIGS. 3 through 15 relate to a preferred embodiment of the smart card reader 100 of the invention. In all Figures, arrow A marks the direction of insertion of a smart card 10. Since the embodiment of FIGS. 3 through 15 is a preferred embodiment of the embodiment shown in FIGS. 1 and 2, similar reference numerals are used for the embodiment of FIGS. 3 through 15 as far as possible.

Figure 3:
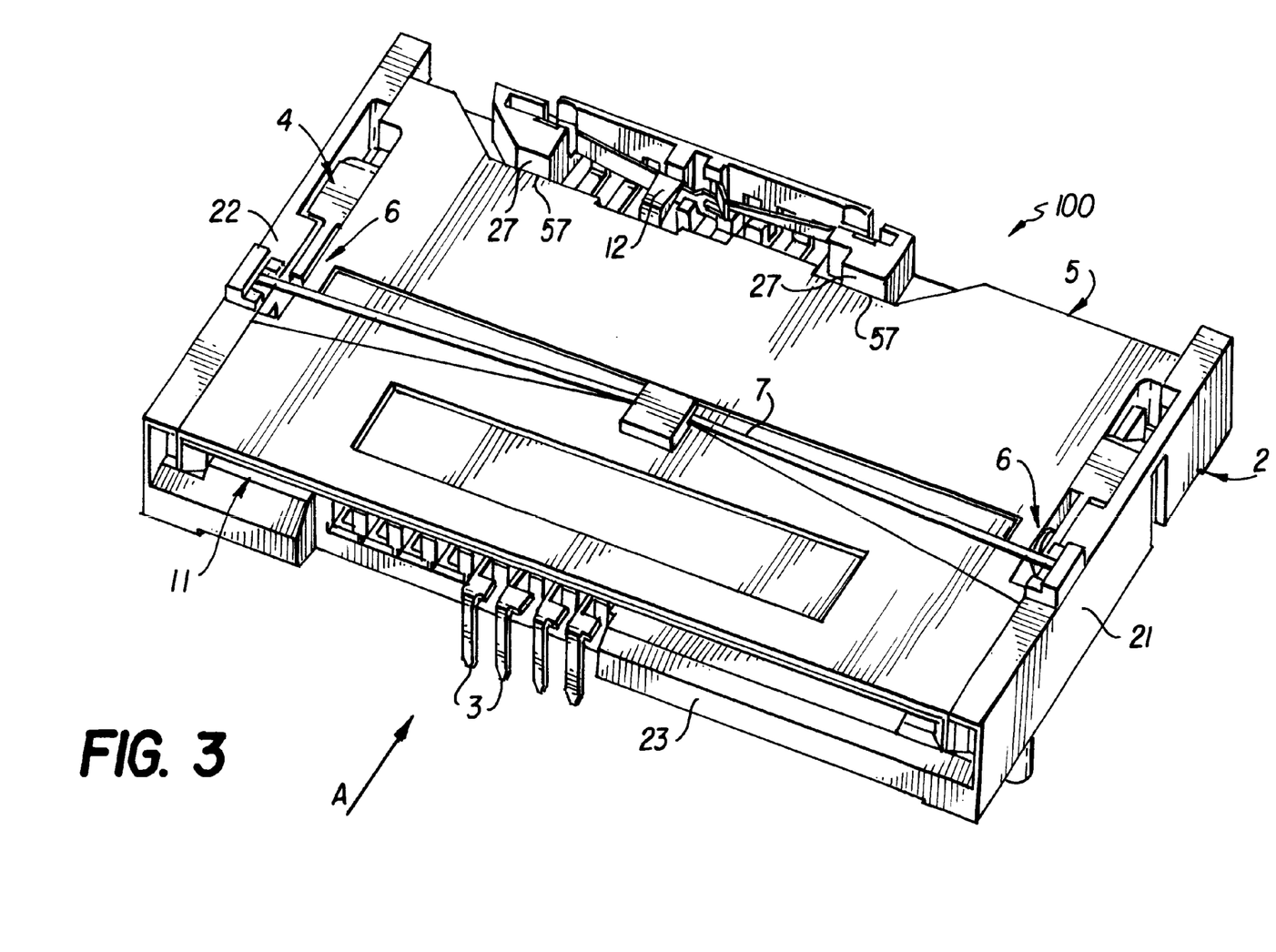
FIG. 3 is a perspective top plan view.

FIG. 3 is a perspective top plan view of the smart card reader 100 disclosing a housing (also called a frame) 2 within which contact elements 3 are fixedly mounted. Preferably, the contact elements 3 are held in the housing 2 by means of cooperating first and second detent means provided in the housing and on the contact elements, respectively. Contact element actuating means in the form of pivot means 4 are pivotally mounted in side walls 21, 22 of the housing 2. Cover 5, also called a card receiving means, forms together with a bottom wall 23 of the housing 2 a card insert slot 11. A card 10 (not shown in FIG. 3) can be inserted into said card insert slot 11 in the direction of arrow A.

Coupling means 6 (to be described below in detail) are provided between said pivot means 4 and said cover 5 so that the insert movement of a smart card 10 into the insert slot 11 causes a pivotal movement of the pivot means 4. Said pivotal movement of the pivot means 4 makes sure that the contact elements 3 will be able to contact the smart card contacts of the smart card 10 when the reading position is reached, i.e. when the cover 5 is in engagement with its abutment means 57 with abutment means 27 of the housing 2. In FIG. 3, the cover 5 is in the insert/take-out position, i.e. not in its the reading position.

A spring 7, preferably a rod spring 7, extends between said two side walls 21, 22 of the housing 2 and is in its center in engagement with an abutment of the cover 5, so as bias cover 5 into its inert/take-out position shown in FIG. 3. FIG. 3 also shows an end position switch 12 mounted at the housing 2. Now the individual components of the smart card reader 100 will be described referring to the different drawings.

The housing 2

Figure 4:
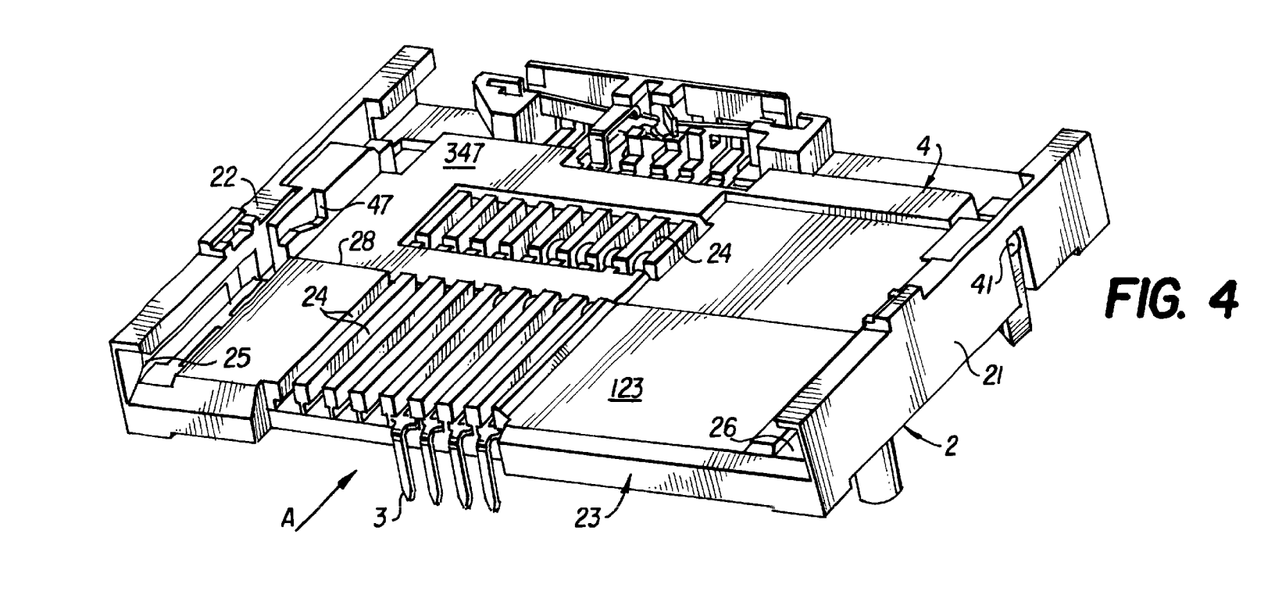
FIG. 4 is a perspective top plan view similar to FIG. 3, but with the cover of the smart card reader being removed and pivot means in a first position holding the contact elements in a non-contact position.

FIG. 4 discloses a perspective top plan view of the housing 2 with the bottom wall 23 extending between the two end walls 21, 22. A plurality of chambers 24 is formed in said bottom wall 23 so as to receive contact elements 3 which are fixedly mounted in said bottom wall. The upper side of the bottom wall forms a card support surface 123 for the bottom surface of the smart card 10. Laterally extending guide slots 25, 26 are provided in said side walls 21, 22 and are adapted to receive guide pins 50, 51 and 52, 53, respectively, of the cover 5 (see for example FIG. 10). The bottom wall 23 further comprises a recess 28 adapted to receive said pivot means 4.

The contact elements 3

Figure 5:
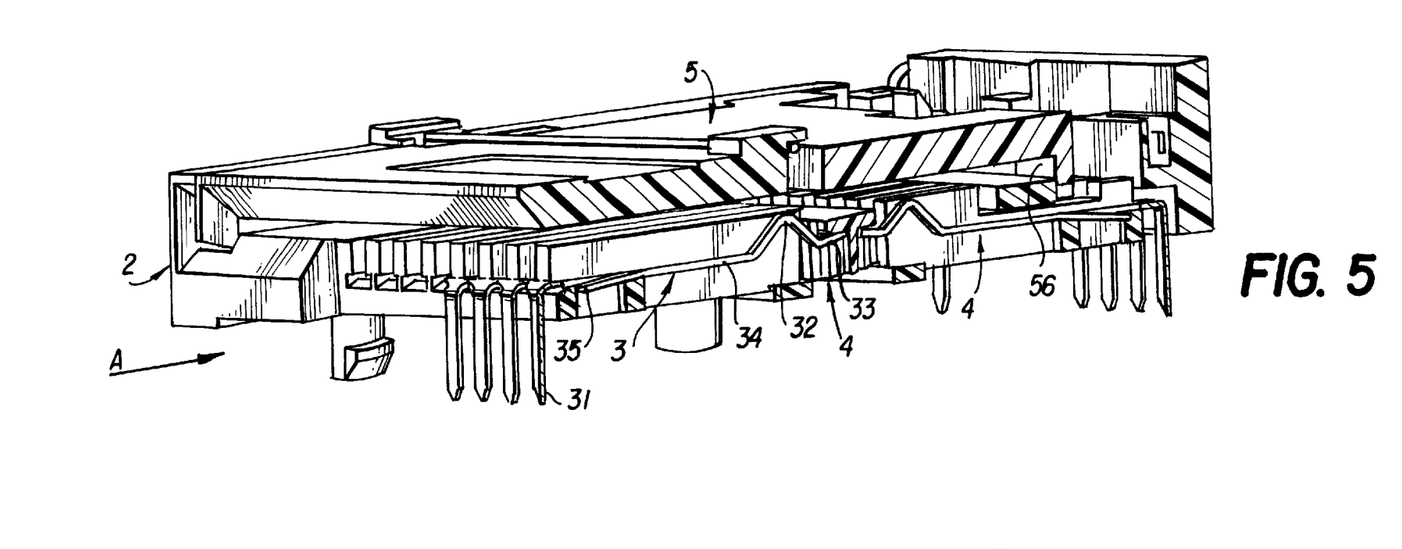
FIG. 5 is a perspective schematic partially sectopmao view of the smart card reader of FIG. 3 in substance from the front, showing the smart card reader in its card insert/take-out position.

For instance FIG. 5 shows the contact elements 3 as comprising a terminal portion 31 which is angled by about 90° with respect to a longitudinal portion 34. The longitudinal portion 34 forms a cusp 32 already mentioned. The cusp 32 continues and ends in an abutment portion 33 which can abut at an abutment surface (348, 349 in FIG. 14) formed by said pivot means 4. The contact element 3 forms detent means 35 in the form of a snap-in arm stamped out of the material of the contact element 3. This snap-in arm 35 cooperates with respective detent means of the housing 2, for instance with a snap-in surface shown in FIG. 5 for the left forward contact element 3.

The pivot means 4

Figure 9:
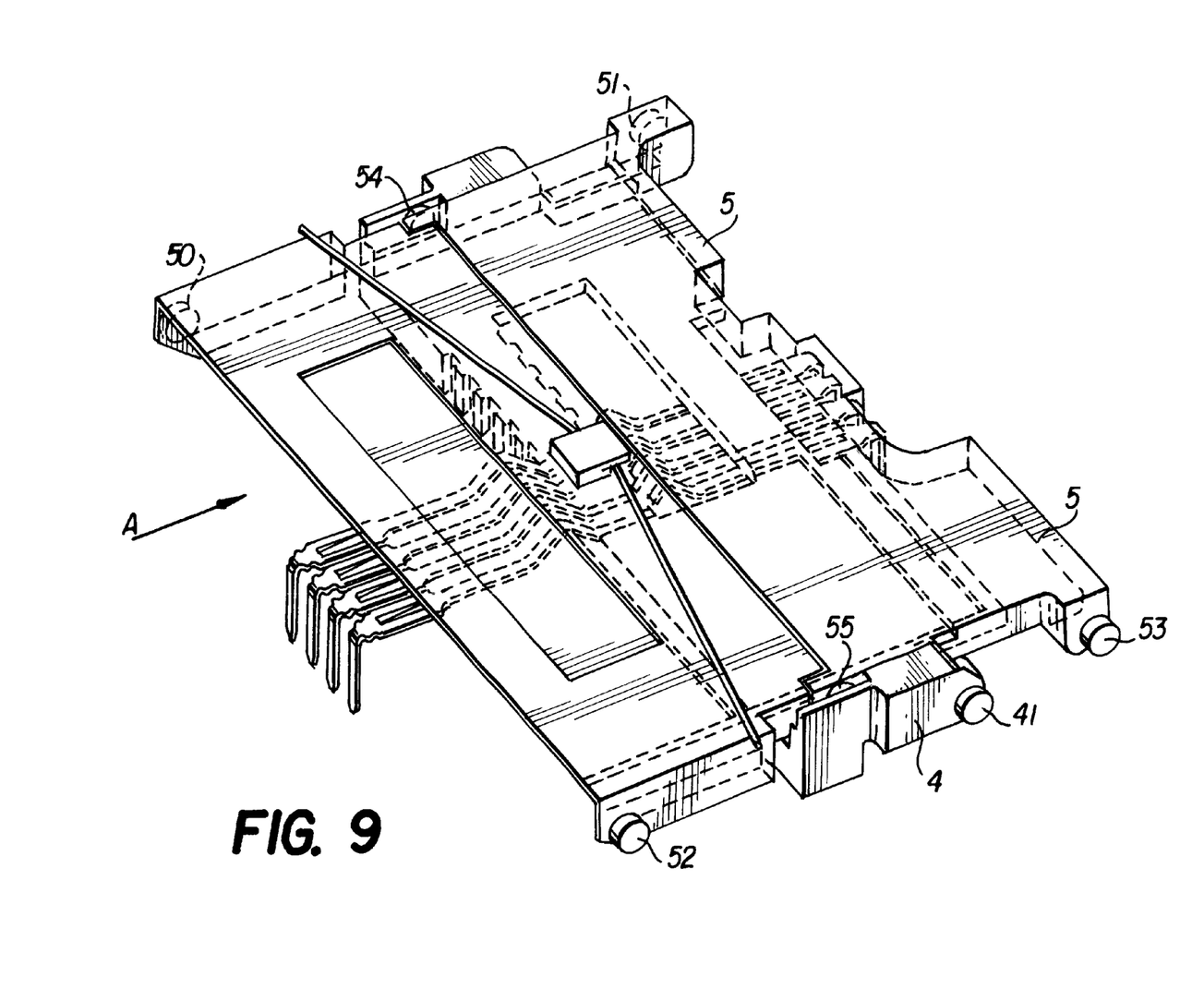
FIG. 9 is a schematic top plan view of the cover of the smart card reader of FIG. 3, with the housing being removed.
Figure 10:
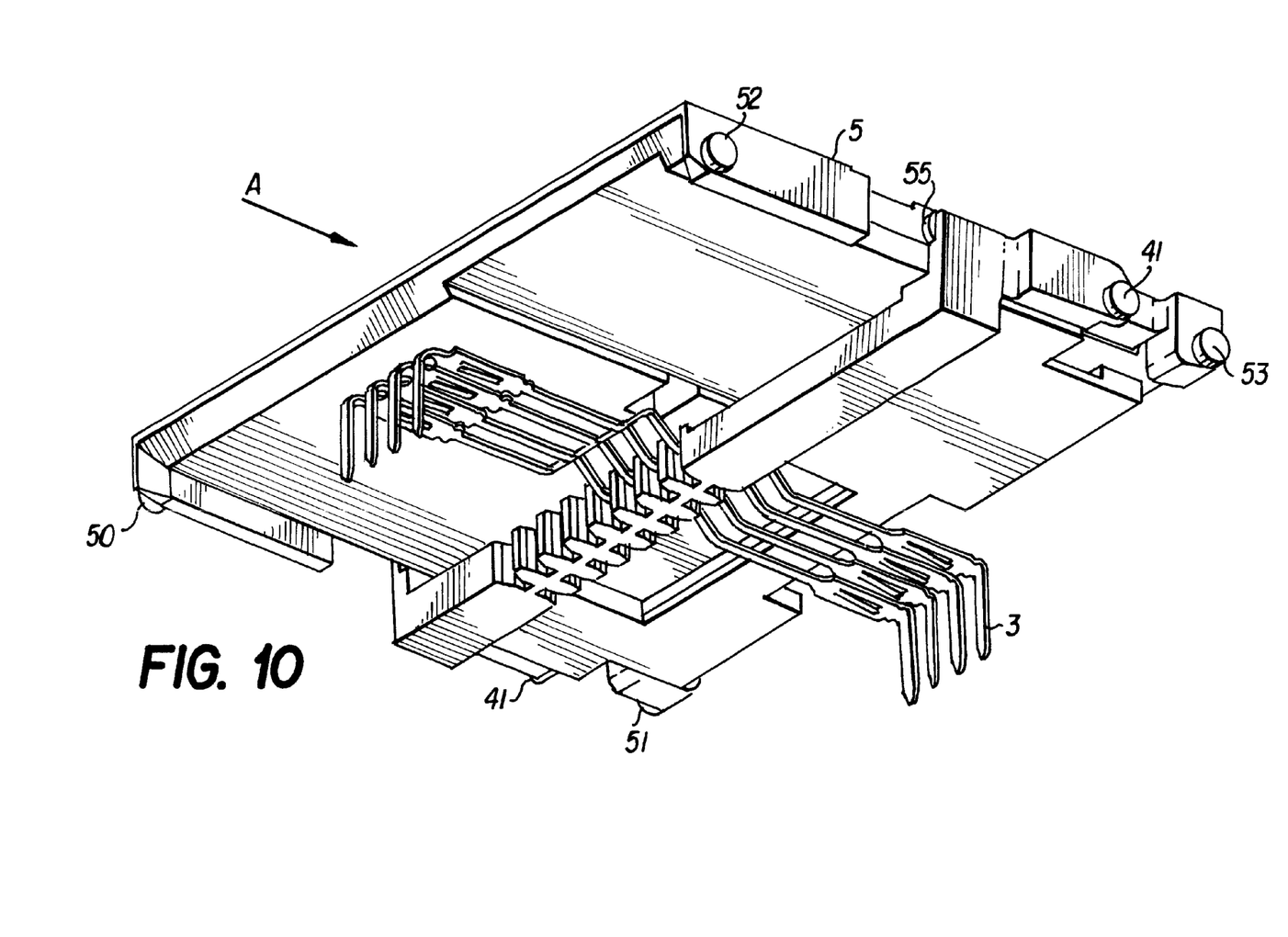
FIG. 10 is a perspective view from the bottom showing the smart card reader of FIG. 3 without the housing.
Figures 11, 13:
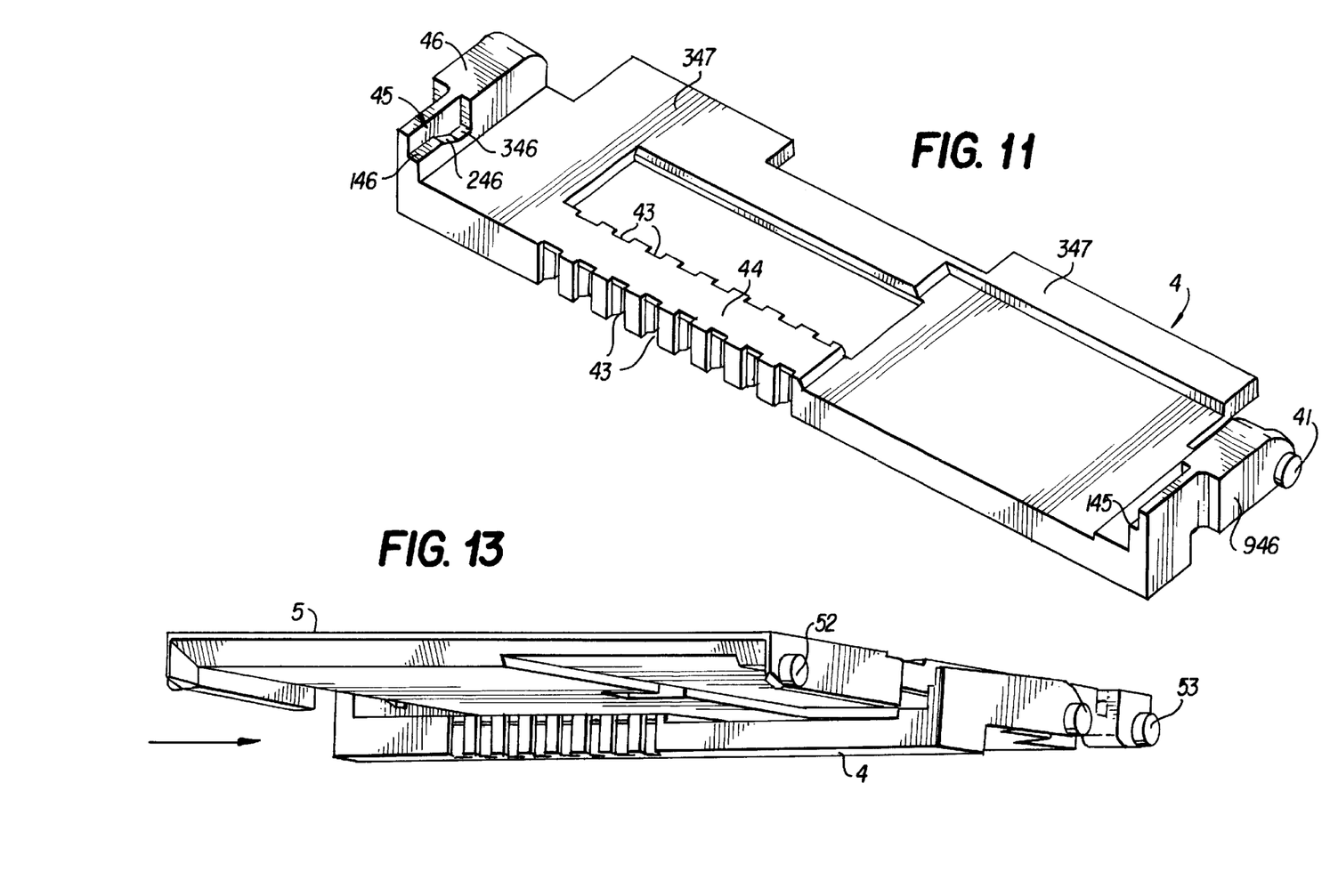
FIG. 11 is a perspective view of a pivot means used in the embodiment of FIGS. 3–13.
FIG. 13 is a schematic perspective view similar to FIG. 12, with the pivot means in a position corresponding to the reading position.
Figure 12:
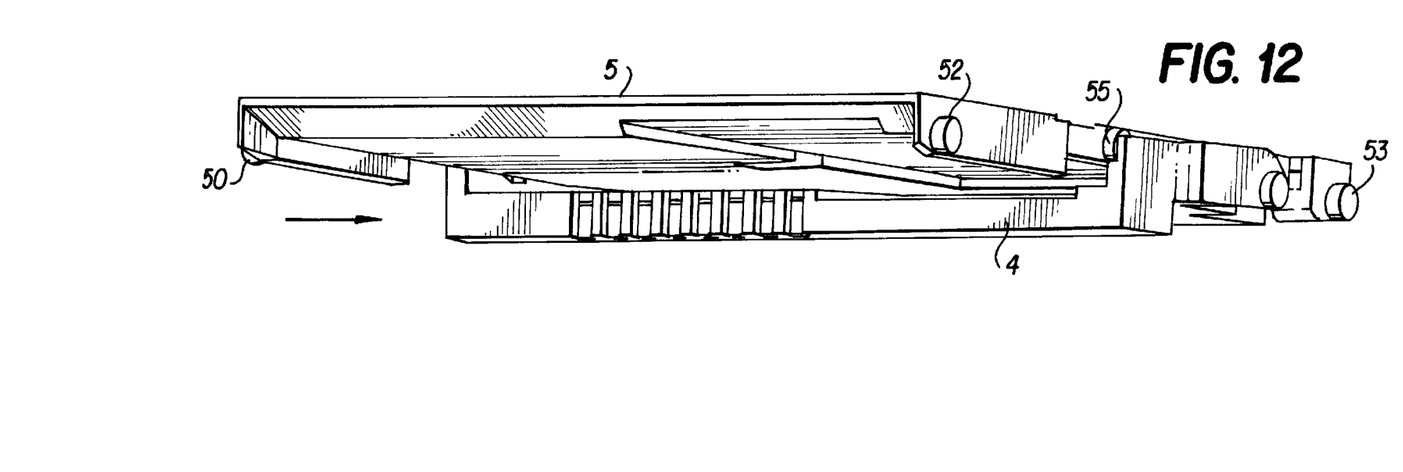
FIG. 12 is a perspective view of the cover and the pivot means without housing in the card insert/take-out position, and from the front of the smart card reader.
Figure 14:
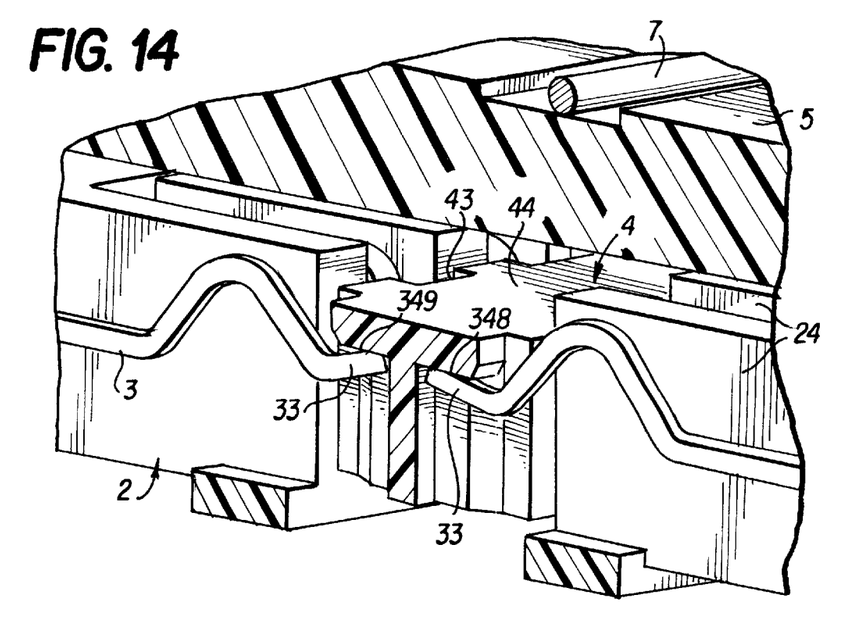
FIG. 14 is a detail of the cooperation between a portion of the pivot means with the contact elements, showing the contact elements in their rest or non-contact position where they are biased into engagement with abutment surfaces of a rib of the pivot means.

FIGS. 4 to 10 and in particular FIG. 11 show the pivot means 4 of the invention. The pivot means 4 is, as is shown in FIG. 11, preferably a substantially rectangular plate which is made of plastic material like the housing 2 and the cover 5. The pivot means 4 is pivotally supported by means of two diametrically opposed pins 41 adapted to be received in respective receiving means in the side walls 21, 22 of the housing 2. The pivot means 4 are, however, not movable in a longitudinal direction of the housing 2. They are indeed stationary with respect to the longitudinal extension of the frame or housing 2. The plate forming the pivot means 4 comprises a rib 44 having cutouts 43. As is shown in FIG. 14, the cutouts 43 extend inwardly and form said abutment surfaces 349 for the abutment parts 33 of the contact elements 3. Thus, the rib presses the contact elements 3 located in said chambers 24 downwardly when the pivot means 4 are in the insert/take-out position of the smart card reader, which is also insert/take-out position of the cover 5. The insert/take-out position could also be referred to as the non-reading position or the initial position of the smart card reader 2.

The plate forming the pivot means 4 further comprises two control or cam surfaces (see FIG. 11) 45 and 145. The cam surfaces 45, 145 are formed in side wall portions 46, 946 of the plate. Said side wall portions 46, 946 also form on the outwardly facing surfaces the mentioned pins 41 of which only one is shown in FIG. 11. Each of said cam surfaces 45, 145 comprises (see FIG. 11) a generally horizontal cam surface 146 on a higher level than a substantially horizontal (lower) cam surface 347 on a lower level with an inclined cam surface 246 being provided therebetween.

The cover 5

Cover 5, see for instance FIGS. 9 and 10, comprises a plate-like structure which extends across the width of the housing 2. The cover 5 is located between the side walls 21, 22 of the housing 2. Cover 5 comprises, besides the laterally extending guide pins 50, 51 and 52, 53, respectively, in addition two diametrically oppositely located cam pins 54, 55. Said cam pins 54, 55 are adapted to be in engagement with the cam surfaces 45 and 145, respectively.

In the initial or insert/take-out position of the smart card reader 100, the cam pins 54, 55 are (see FIG. 12) located on the cam surfaces 146, i.e. the pivot means 41 is pivoted about its pivot axis (pins 41, 42) in a counterclockwise direction (FIG. 7) and thus the contact elements 3 are held in their lower downwardly pressed position, i.e. in their non-contact position against the force exerted by said contact elements 3. When the cover 5 is moved by inserting the card 10 into the card reading position, its pins 54, 55 will move toward the lower cam surfaces 346. As a consequence the biasing force of the contact elements 3 will pivot the pivot means 4 upwardly in a card reading position shown in FIGS. 6, 8, 13 and 15.

Industrial Applicability

Figure 6:
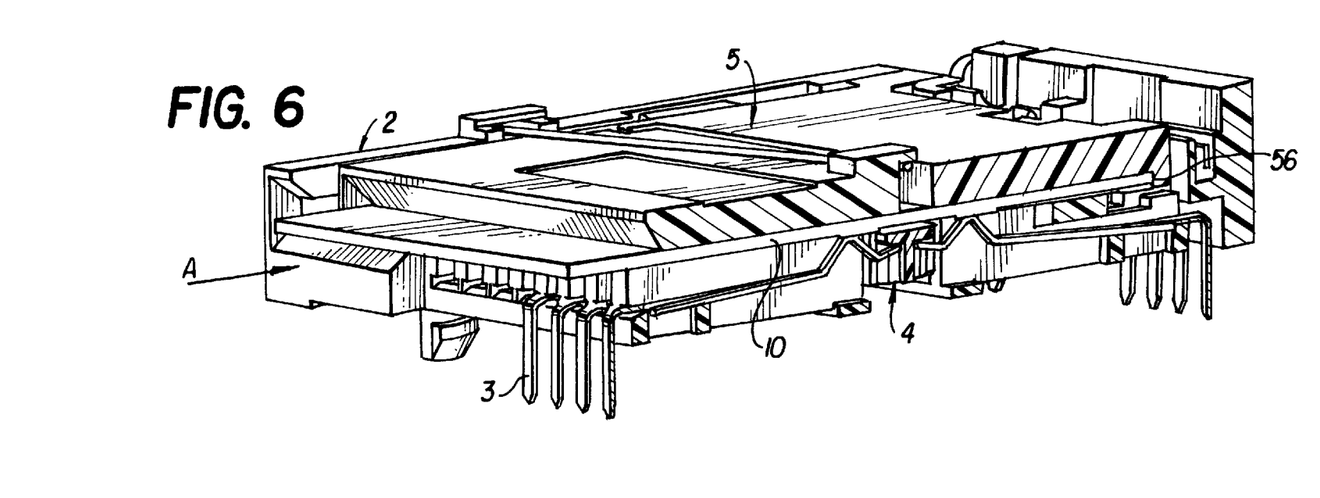
FIG. 6 is a view of the smart card reader of FIG. 5 in its reading position, with the smart card being inserted.
Figure 15:
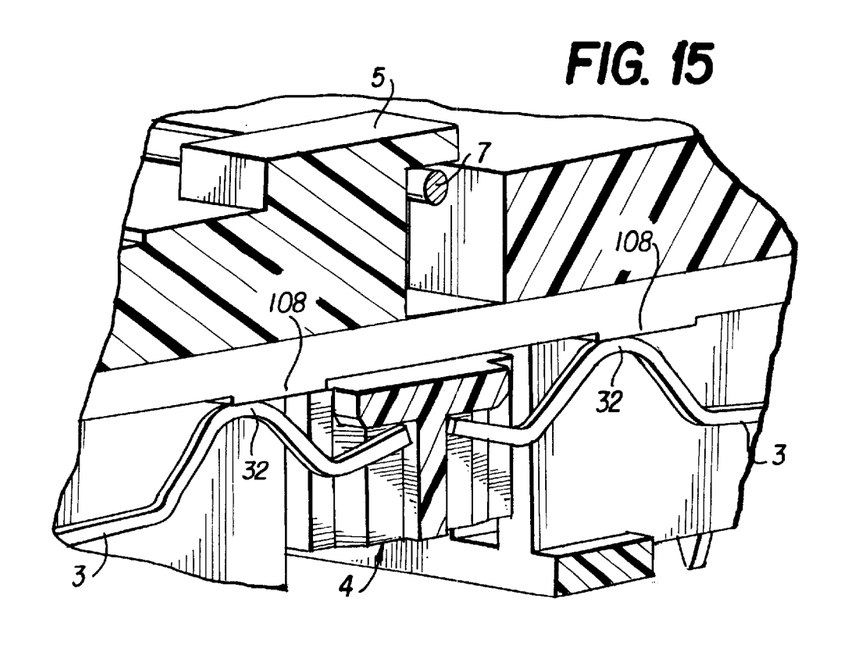
FIG. 15 is a detail similar to FIG. 14, with the contact elements being released from said pivot means such that they are in contact, engagement or abutment with the card contacts of the smart card.

When a smart card 10 is inserted into the insert slot 11 (see for instance FIG. 3), the smart card 10 will contact after a short while the abutment surface 56 of the cover 5 and then move the cover 5 out of its initial position shown in FIG. 3 into a position shown for instance in FIG. 6 where the abutment means 57 (see FIG. 3) are in abutment with the abutment means 27 of the housing 2. This position is shown in FIG. 6. It is also referred to as the card reading position. This reading position is also shown in FIG. 15 in some detail. During the movement from the initial position into the reading position, the pivot means 4 is pivoted from the rest or non-contact position shown in FIGS. 5 and 7 into the reading position shown in FIGS. 6 and 8. As can be seen for instance in FIG. 8, the pivot means 41 is pivoted into a horizontal position.

Figure 7:
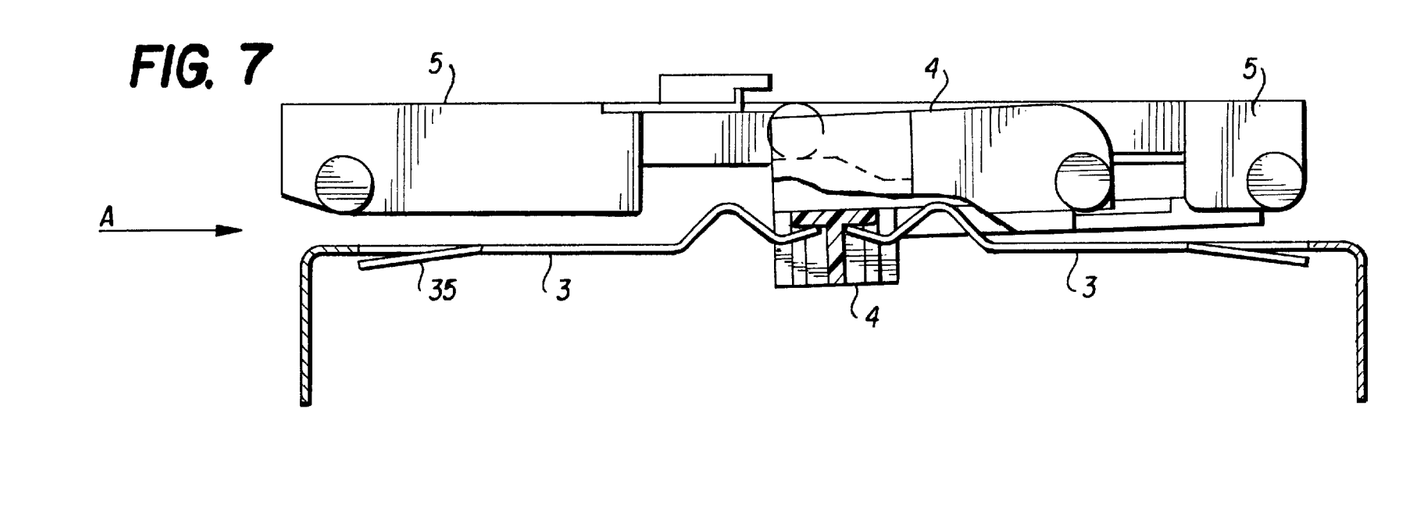
FIG. 7 is a schematic side elevational view of the smart card reader of FIG. 3 in its cart insert/take-out position corresponding to said FIG. 5.
Figure 8:
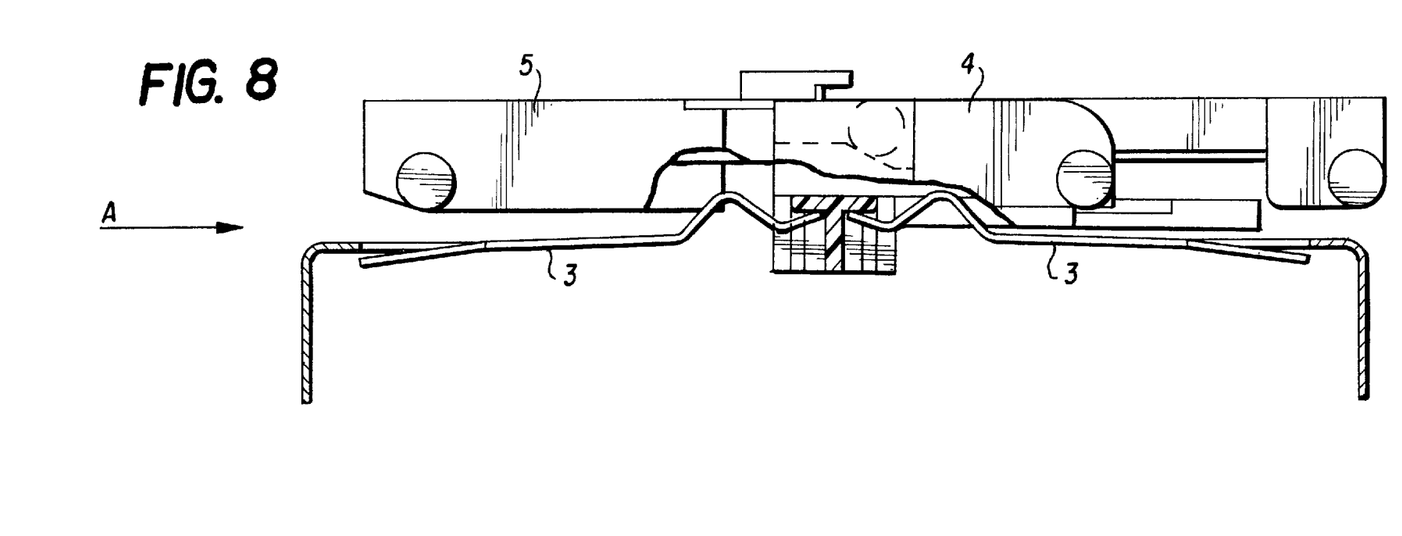
FIG. 8 is a schematic sectional view of the smart card reader of FIG. 3 in a reading position corresponding to FIG. 6.

FIGS. 5 and 7 show the smart card reader 100 in its initial position. It is noted that in this position, the pivot means 4 is pivoted with respect to its reading position such that the contact elements 3 are held in their depressed or lowered position, so that the contact cusps 32 do not project beyond the upper surface 123. This situation is also shown in FIG. 4.

Again, when the card 10 is inserted, it moves the cover 5 against the force of the spring 7 until the abutment surface 27 of the housing 2 is engaged, and during this movement of the cover 5, the cam pins 54, 55 move from the substantially horizontal cam surface portions 146 via the inclined cam surfaces 246 to the lower surfaces 346 and thus cause a pivotal movement of the pivot means 4 into the substantially horizontal position in which the upper surface 347 of the pivot means 4 is aligned with the upper surface 123 of the housing 2 and in which the rib 44 releases the contact elements 3 for a movement to engage the smart card contacts 108 as shown in FIG. 15.

After a reading operation has been completed, the card 10 is pulled out of the insert slot 11. The cover 5 then moves into its initial position due to the force of spring 7. The cover 5 will also pivot the pivot means 4 back to their non-contact position.

Preferably a separate brake is provided which holds the smart card in its reading position. It is preferred to provide a brake which acts upon the width of the smart card, i.e. perpendicular with respect to the direction of insertion of the smart card

What is claimed is:

1. A smart card reader for reading a smart card, the reader comprising:

a housing defining a support surface for the smart card when inserted therein, contact elements fixedly mounted in said housing, a pivot member pivotably mounted in said housing to move said contact elements between a depressed non-contact position in which said contact elements are blocked from a movement beyond said support surface, a released non-blocked contact position engaging card contacts of the smart card inserted into said smart card reader, and supported by said support surface, and a cover slidably mounted in said housing and adapted to be actuated by said smart card to pivot said pivot member to move said contact elements between said blocked non-contact position and said released non-blocked contact position, wherein coupling means are provided between said pivot member and said cover so as to actuate the pivot member, and wherein the cover is reciprocally mounted in said housing between an initial position and a card reading position, and wherein spring means being provided between said housing and said cover so as to bias said cover into said initial position.

2. The smart card reader of claim 1, wherein said coupling means provide a direct guide function between the cover and said, pivot means.

3. A smart card reader for reading a smart card, the reader comprising:

a housing defining a support surface for the smart card when inserted therein, contact elements fixedly mounted in said housing, a pivot member pivotably mounted in said housing to move said contact elements between a depressed non-contact position in which said contact elements are blocked from a movement beyond said support surface, a released non-blocked contact position engaging card contacts of the smart card inserted into said smart card reader, and supported by said support surface, and a cover slidably mounted in said housing and adapted to be actuated by said smart card to pivot said pivot member to move said contact elements between said blocked non-contact position and said released non-blocked contact position, wherein coupling means are provided between said pivot member and said cover so as to actuate the pivot member, and wherein said coupling means comprise a pin in said cover or said pivot member and cooperating therewith cam surfaces of said pivot member and cover respectively.

4. A smart card reader for reading a smart card, the reader comprising:

a housing, contact elements fixedly mounted in said housing, a pivot member adapted to move said contact elements between a depressed non-contact position and a released contact position engaging card contacts of the smart card inserted into said smart card reader;

wherein coupling means are provided between said pivot member and said cover so as to actuate the pivot member by said cover;

wherein said coupling means comprise a pin in said cover or said pivot member and cooperating therewith cam surfaces of said pivot member and cover respectively;

wherein the cam surfaces comprise two cam pins of the cover formed in said cover and laterally extending for cooperation with two pivot-member cam surfaces provided in said pivot member.

5. The smart card reader of claim 3, wherein said contact elements are biased toward the card contacts of the smart card.

6. The smart card reader of claim 3, wherein said contact elements are biased into the released non-blocked contact position.

7. The smart card reader of claim 3, wherein said support surface is fixed relative to said housing.

* * * * *

UNITED STATES PATENT AND TRADEMARK OFFICE
CERTIFICATE OF CORRECTION

PATENT NO. : 6,402,036 B1
DATED : June 11, 2002
INVENTOR(S) : Robert Bleier

It is certified that error appears in the above-identified patent and that said Letters Patent is hereby corrected as shown below:

Column 1,
Line 10, change "cards" to -- card --;
Line 11, change "cart" to -- card --;

Column 7,
Line 7, change "elongate" to -- elongated --;
Line 65, change "a" to -- an --;
Line 67, change the period "." to a comma -- , --.

Column 3,
Line 3, insert a comma -- , -- after "Summarizing";
Line 10, change "cart" to -- card --;
Line 25, after "to" insert -- be --.

Column 4,
Line 15, after "DETAILED DESCRIPTION OF PREFERRED EMBODIMENTS", change "FIG." to -- FIGS --.

Column 5,
Line 11, change "cart" to -- card --;
Line 52, delete "the".

Signed and Sealed this

Twelfth Day of October, 2004

JON W. DUDAS
*Director of the United States Patent and Trademark Office*